(No Model.)
J. BEATTIE, Jr.
BATTERY ZINC.
No. 383,271. Patented May 22, 1888.
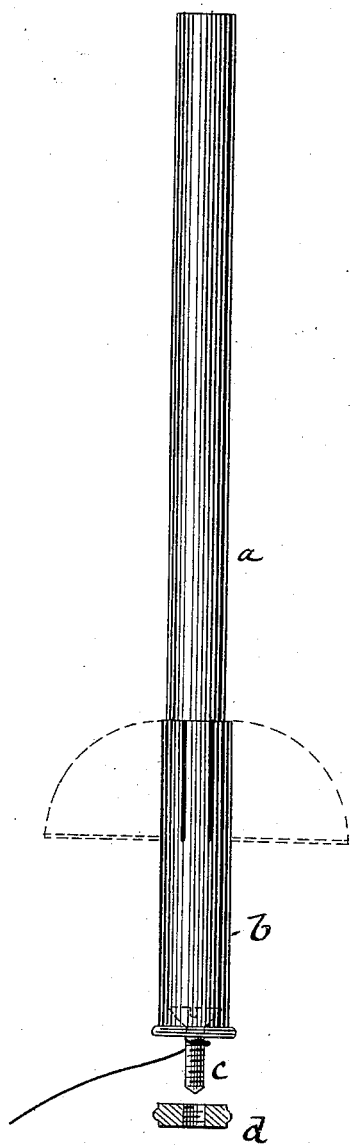
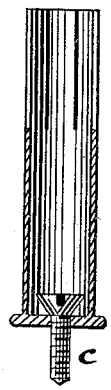
WITNESSES:
INVENTOR,
John Beattie, Jr.
BY
ATTORNEY.

UNITED STATES PATENT OFFICE.

JOHN BEATTIE, JR., OF FALL RIVER, MASSACHUSETTS, ASSIGNOR TO THE BEATTIE BATTERY ZINC AND ELECTRICAL COMPANY, OF SAME PLACE.

BATTERY-ZINC.

SPECIFICATION forming part of Letters Patent No. 383,271, dated May 22, 1888.

Application filed January 10, 1888. Serial No. 260,308. (No model.)

*To all whom it may concern:*

Be it known that I, JOHN BEATTIE, Jr., of Fall River, in the county of Bristol and State of Massachusetts, a citizen of the United States, have invented certain new and useful Improvements in Battery-Zinc Connections and Re enforces, of which the following is a specification.

My invention has reference to a connecting device and re enforce for battery-zincs, the object being to furnish a simple and very efficient means for connecting up the zinc element of batteries, and also to re-enforce it at the head to prevent crumbling or breaking of the zinc at that place.

The device is best adapted to the pencil-zinc for open-circuit batteries; and it consists of a cap of brass, copper, or other conducting material, shaped like a cartridge-shell, and having a screw fitting into its head to receive the binding-nut. The cap fits down tightly over the head of the zinc, and, while serving as a good connection, also preserves the head of the zinc from injury.

The details of the invention will be fully set forth in the following description, and pointed out in the claims.

In the drawings, Figure 1 is an elevation of a pencil zinc provided with the cap and screw; Fig. 2, a view of the cap and screw alone in section; Fig. 3, an elevation of a zinc, showing a modification of the invention.

$a$ represents a battery-zinc, (shown here as the ordinary pencil-zinc.) Obviously, however, other forms—such as the plate—may be fitted with my improvements.

$b$ is a cap or shell of copper, brass, or other conducting material, the upper end being closed and, preferably, of heavier metal than the body of the cap. The end is perforated centrally to receive a screw, $c$, which is an ordinary square-end conical-head screw. The head of this screw is on the inside of the cap and projects outward to receive a binding-nut, $d$. The cap may be adjusted to the head of the zinc by forcing it down over the same until the flat head of the screw rests against the flat head or end of the zinc, or it may be adjusted in any other way which will give good contact between the cap, screw, and zinc. I prefer, however, to place the cap, with the screw in position therein, into the bottom of the mold in which the zinc is cast, and then to pour in the molten metal. This method insures a perfect lock between the parts, the head of the screw being dovetailed or mortised in.

The connecting-wire is placed between the nut $d$ and the flat head of the cap, and then clamped securely by the nut. The cap furnishes a flat and broad surface for contact with the wire.

I have shown the cap slitted in several places at its lower end. If desired, these ends may be bent outward to rest on the edge of the battery-jar or other part of the cell to support the zinc or to limit the amount of zinc exposed to the solution. I may also dispense with the screw $c$ and bore a lateral hole directly through the cap and zinc to receive the wire, and then use a clamping-screw, $e$, to hold the wire in place, as shown in Fig. 3. This could easily be done without breaking the zinc, as the shell would prevent such an occurrence.

I claim as my invention—

1. A re-enforce and connection for battery-zincs, consisting of a cap or shell of conducting material adapted to fit over the head of the zinc and extend down upon its body some distance.

2. A re enforce and connection for battery-zincs, consisting of the combination, with a metallic cap or shell, of a screw passing through the head of the cap to receive a tightening-nut, as set forth.

3. As a new article of manufacture, a battery-zinc provided with a cap or shell of metal and a screw or rod, as $c$, for connection, substantially as described.

4. The combination, with a battery-zinc, of the cap or shell provided with a screw to receive a clamping-nut having a conical head, the screw being connected with the zinc by a dovetail or mortised connection.

5. The combination, with the zinc, of the cap or shell slitted, as described, and provided with the screw $c$.

In witness whereof I have hereunto signed my name in the presence of two subscribing witnesses.

JOHN BEATTIE, JR.

Witnesses:
CHAS. B. WOODMAN,
GEORGE E. BAMFORD.